United States Patent
Steffanut

(10) Patent No.: US 8,815,755 B2
(45) Date of Patent: Aug. 26, 2014

(54) POLYDIORGANOSILOXANE BEARING CARBAMATE FUNCTIONS, THEIR PREPARATION AND THEIR USE AS SOFTENERS IN THE TEXTILE INDUSTRY

(75) Inventor: Pascal Steffanut, Village-Neuf (FR)

(73) Assignee: Clariant Finance (BVI) Limited (VG)

( * ) Notice: Subject to any disclaimer, the term of this patent is extended or adjusted under 35 U.S.C. 154(b) by 501 days.

(21) Appl. No.: 12/993,724

(22) PCT Filed: Jun. 12, 2009

(86) PCT No.: PCT/EP2009/057262
§ 371 (c)(1),
(2), (4) Date: Dec. 16, 2010

(87) PCT Pub. No.: WO2009/150213
PCT Pub. Date: Dec. 17, 2009

(65) Prior Publication Data
US 2011/0097567 A1   Apr. 28, 2011

(30) Foreign Application Priority Data

Jun. 13, 2008 (EP) .................................... 08010780

(51) Int. Cl.
*B32B 5/02* (2006.01)
*B32B 27/04* (2006.01)
*D06M 13/224* (2006.01)

(52) U.S. Cl.
USPC ........... 442/102; 442/130; 428/391; 252/8.63

(58) Field of Classification Search
USPC .................. 442/59, 81, 87, 97, 130, 99, 102; 428/221, 391
See application file for complete search history.

(56) References Cited

U.S. PATENT DOCUMENTS

| | | | |
|---|---|---|---|
| 2,947,771 A | 8/1960 | Bailey |
| 3,355,424 A | 11/1967 | Brown |
| 3,890,269 A | 6/1975 | Martin |
| 4,104,296 A | 8/1978 | Pike |
| 4,500,438 A | 2/1985 | Kelly |
| 4,534,700 A | 8/1985 | Horler et al. |
| 5,302,657 A | 4/1994 | Huhn et al. |
| 6,376,696 B1 | 4/2002 | Raab et al. |
| 2007/0260010 A1 | 11/2007 | Herzig |
| 2007/0260081 A1 | 11/2007 | Herzig |

FOREIGN PATENT DOCUMENTS

| | | |
|---|---|---|
| DE | 102006020818 | 11/2007 |
| KR | 20070072069 | 1/2009 |
| WO | WO 2008/008077 | 1/2008 |

OTHER PUBLICATIONS

PCT International Search Report for PCT/EP 2009/057262, mailed Jul. 28, 2009.
English Abstract for KR 20070072069, Jan. 22, 2009.

*Primary Examiner* — Lynda Salvatore
(74) *Attorney, Agent, or Firm* — Miles & Stockbridge P.C.

(57) ABSTRACT

The instant invention relates to polydiorganosiloxane oils having branched carbamate functions, their preparation and their use as softeners in the textile industry.

14 Claims, No Drawings

POLYDIORGANOSILOXANE BEARING CARBAMATE FUNCTIONS, THEIR PREPARATION AND THEIR USE AS SOFTENERS IN THE TEXTILE INDUSTRY

The present invention concerns polydiorganosiloxane having branched carbamate functions, their preparation and their use as softeners in the textile industry. There is extensive literature on amino-or amido functional silicone compounds. These compounds are used for example as plasticizers in the textile industry, as surface treating agents, as thickeners or in the cosmetic industry. Nonetheless, there is a demand in the textile industry for softening substances which lead to products having a superior hand feel and which do not have the disadvantage of unstable emulsions in use.

U.S. Pat. No. 4,104,296 describes organo-functional silicone components with hydroxyalkylamido functions which are linked to the silicone chain through one divalent hydrocarbyl residue having at least three carbon atoms. The silicone components are prepared through the reaction of an aminoalkylsilane or -siloxane with a lactone derived from a, β-hydroxycarboxylic acid with a chain length of from $C_3$ to $C_9$. These components are supposed to improve the adhesion of various resins to inorganic substrates.

WO 2008/008077 describes carbamate-functional polyorganosiloxanes prepared by the reaction of end-capped amino-functional polyorganosiloxanes with isocyanates or cyclic carbonates. These compounds react further via their free OH group with lactones to form polysiloxane—polylactone polymers. The functionalized polysiloxanes so obtained may be useful in a variety of settings like antifouling material in marine environments.

It has now also been found that certain silicone oils having side chain nitrogen atoms are reacting easily with cyclic carbonates to give the corresponding carbamate functionalized silicone oils and that these compounds may be processed into stable aqueous dispersions having surprisingly good properties when used as softeners in the textile industry and lead to products having a pleasant, soft hand feel.

It was the object of the present invention to provide polydiorganosiloxanes having branched carbamate functions, especially for a finishing agent, which exhibits a high yellowing resistance in addition to improved soft feel properties and can be applied on high-shear application systems without difficulty.

In a first embodiment, the invention relates to polydiorganosiloxanes having branched carbamate functions of general formula (I)

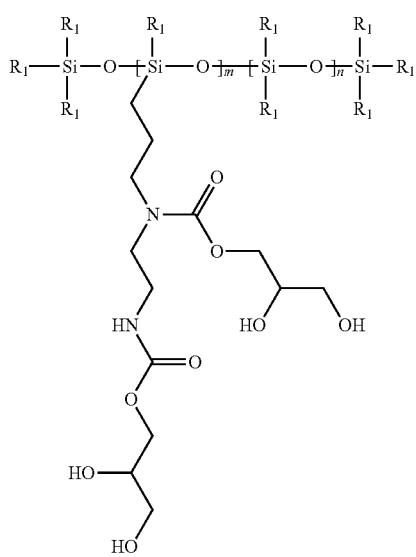

wherein
$R_1$ represents the same or different monovalent $C_1$ to $C_{18}$ hydrocarbon residues,
m has an average value of from 1 to 50; and
has an average value of from 10 to 1500, Examples of $C_1$-$C_{18}$ hydrocarbon residues $R_1$ include alkyl residues, such as methyl, ethyl, n-propyl, iso-propyl, n-butyl, iso-butyl, tert-butyl, n-pentyl, neo-pentyl, tert-pentyl residues, hexyl residues, heptyl residues, such as n-heptyl residue, octyl residues and iso-octyl residues, such as 2,2,4-trimethylpentyl residue, nonyl residues, such as n-nonyl residue, decyl residues, such as n-decyl residue, dodecyl residues, such as n-dodecyl residue, cycloalkyl residues, such as cyclopentyl, cyclohexyl, cycloheptyl residues and methylcyclohexyl residues, aryl residues, such as phenyl and naphthyl residues, alkaryl residues, such as o-, m-, p-tolyl residues, xylyl residues and ethylphenyl residues, aralkyl residues, such as benzyl residue, α- and β-phenylethyl residue.

The above hydrocarbon residues optionally contain an aliphatic double bond. Examples thereof are alkenyl residues, such as vinyl, allyl, 5-hexen-1-yl, E-4-hexen-1-yl, Z-4-hexen-1-yl, 2-(3-cyclohexenyl)ethyl and cyclododeca-4,8-dienyl residues. Preferred residues with an aliphatic double bond are the vinyl, allyl and 5-hexen-1-yl residues. Preferably, however, at most 1% of the hydrocarbon residues R1 contain a double bond.

In the above general formula (I), preferably and independently:
$R_1$ represents methyl and/or phenyl;
m has a value of from 1 to 10; and
n has a value of from 40 to 600;

The compound of formula I may be produced by first synthesizing an amino alkyl branched polydiorganosiloxane of formula (II). The synthesis of these amino-substituted polydiorganosiloxanes is known to the person skilled in the art as published in U.S. Pat. No. 3,355,424, 2,947,771, 3,890,269 and is a polycondensation reaction leading to the insertion of a dialkoxyalkylsilane units bearing alkylamino groups into the chain of a silo xane. The reaction is normally carried out in the presence of an acidic or alkaline catalyst. The reaction may also be carried out as a polymerization reaction using dialkoxyalkysilanes and cyclic siloxanes.

Subsequently, a cyclic carbonate such as glycerine carbonate (compound of formula A) is added to form the hydroxy alkyl carbamate branched polysiloxane polymer of formula (I).

Therefore, another embodiment of the present invention consists in the preparation of the above mentioned polydiorganosiloxanes of formula I by reacting an amino-functional polydiorganosiloxane of formula (II).

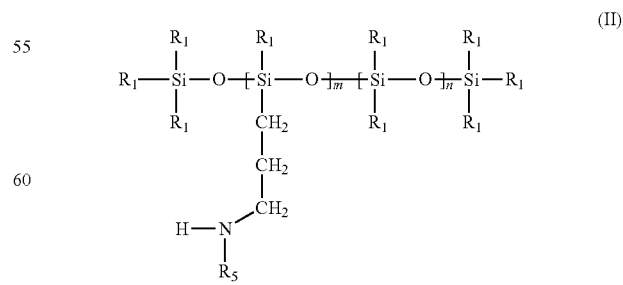

wherein $R_1$ is defined as in formula (I); $R_5$ is —H or —$CH_2$—$CH_2$—$NH_2$, m has an average value of from 1 to 50;
n has an average value of from 10 to 1500;
with the following compound (A)

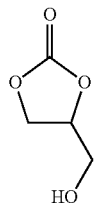

(A)

In the above formula (II) preferably and independently:
$R_1$ represents methyl and/or phenyl;
m has a value of from 1 to 10;
n has a value of from 40 to 600;

Preferred branched amino-functional polydiorganosiloxanes of general formula (II) are linear α, ω dimethylpolydimethylsiloxanes.

The content of titrable nitrogen in the compound of formula II is preferably An=0.01 mmol/g to 2.0 mmol/g, especially 0.1 mmol/g to 1.0 mmol/g. An stands for amine number. The branched aminopolydiorganosiloxanes of general formula (II) preferably have an average viscosity of from 50 to 100,000 centipoises, especially from 100 to 15,000 centipoises at 25° C.

The reaction may optionally be performed in the presence of a suitable solvent. Preferred are polar solvents, such as alcohols or ketones, examples of which are methanol, ethanol, propanol, isopropanol, acetone or ethyl methyl ketone.

Preferably, the reaction is performed at temperatures within a range of from 40 to 150° C., depending on the solvent employed.

More preferably, the reaction is performed at temperatures within a range of from 80 to 120° C., without solvent.

The content of titrable nitrogen in the resulting compound of formula I is preferably less than An=0.1 mmol/g. An stands for amine number.

The polydiorganosiloxanes of general formula (I) are preferably employed in the form of aqueous formulations. Preferred formulations are emulsions.

Based on the total composition, such formulations contain from 2 to 80% by weight of one or more polydiorganosiloxane of formula (I). A suitable process for the preparation of emulsions of polydiorganosiloxanes is known, for example, from U.S. Pat. No. 5,302,657.

In the instant invention, the emulsion is preferably prepared with an emulsifier soluble in the polydiorganosiloxane of formula I in two steps, wherein the first step yields a concentrate which is diluted with water in the second step. Such emulsions contain from 2 to 40% by weight of one or more emulsifiers, based on the total composition.

Particularly suitable anionic emulsifiers include:
1. Alkyl sulfates, especially those having a chain length of from 8 to 18 carbon atoms, and alkyl ether sulfates with from 8 to 18 carbon atoms in the hydrophobic residue and from 1 to 40 ethylene oxide (EO) or propylene oxide (PO) units.
2. Sulfonates, especially alkyl sulfonates with from 8 to 18 carbon atoms, taurides, esters and half-esters of sulfosuccinic acid with monohydric alcohols or alkylphenols with from 4 to 15 carbon atoms; optionally, these alcohols or alkylphenols may also be ethoxylated with from 1 to 40 EO units.
3. Alkali and ammonium salts of carboxylic acids having from 8 to 20 carbon atoms with an alkyl, aryl, alkylaryl or aralkyl residue.
4. Phosphoric acid partial esters and their alkali and ammonium salts, especially alkyl and alkylaryl phosphates with from 8 to 20 carbon atoms in the organic residue, alkyl ether or amyl ether phosphates with from 8 to 20 carbon atoms in the alkyl or alkaryl residue and from 1 to 40 EO units.

Particularly suitable non-ionic emulsifiers include:
1. Alkyl polyglycol ethers, preferably those with from 4 to 40 EO units and alkyl residues of from 8 to 20 carbon atoms.
2. Alkyl aryl polyglycol ethers, preferably those with from 4 to 40 EO units and alkyl residues of from 8 to 20 carbon atoms in the alkyl and aryl residues.
3. Ethylene oxide/propylene oxide (EO/PO) block polymers, preferably those with from 4 to 40 EO or PO units.
4. Fatty acids with from 6 to 24 carbon atoms.
5. Natural substances and their derivatives, such as lecithin, lanolin, saponins, cellulose; cellulose alkyl ethers and carboxyalkylcelluloses, whose alkyl groups respectively contain up to 4 carbon atoms.
6. Linear polydiorganosiloxanes containing polar groups, especially linear polydiorganosiloxanes containing polyether groups.
7. Saturated and unsaturated alkoxylated fatty amines having from 8 to 24 carbon atoms.

Particularly suitable cationic emulsifiers include:
8. Salts of primary, secondary and tertiary fatty amines with from 8 to 24 carbon atoms with acetic acid, hydrochloric acid and phosphoric acid.
9. Quaternary alkylbenzeneammonium salts, especially those whose alkyl group has from 6 to 24 carbon atoms, especially the halides, sulfates, phosphates and acetates.
10. Alkylpyridinium, alkylimidazolinium and alkyloxazolinium salts, especially those whose alkyl chain has up to 18 carbon atoms, especially the halides, sulfates, phosphates and acetates.

Suitable emulsifiers for the preparation of the emulsions further include fatty acid polyglycol esters, polyethoxylated fatty acid glycerides and sorbitan esters, alkyl polyglycosides, fatty acid alkylol amides, alkyl ether carboxylic acids, alkaryl ether carboxylic acids, ethoxylated quaternary ammonium salts, amine oxides, betains, sulfobetains and sulfosuccinates.

Optionally, an organic hydrotropic agent, can be employed in the aqueous formulation of the compound of formula I in an amount of from 0 to 20% by weight, based on the total composition. "Hydrotropic agent" means a substance which improves the water-solubility of a hardly soluble substance and thus acts as a solubilizer. At the same time, a hydrotropic agent reduces the viscosity of the substance to be processed.

The hydrotopic agent can be selected from the group of polyfunctional alcohols. Thus, dialcohols with from 2 to 10, preferably from 2 to 6, especially from 2 to 4, carbon atoms per molecule can be employed. Also well suitable are their mono- and diethers as well as the mono- and diesters of these dialcohols. Examples thereof to be used more preferably include 1,2-propylene glycol, dipropylene glycol and butyl diglycol.

Optionally, the formulation of the polydiorganosiloxane of formula (I) may contain from 0 to 96% by weight of water.

Optionally, both inorganic and organic acids and/or their anhydrides in an amount of from 0 to 5% by weight, based on the total composition can be used to adjust the pH of the formulation. Thus, for example, hydrochloric acid, sulfuric acid or phosphoric acid are used as inorganic acids. Alternatively, organic acids may be used, such as formic acid, acetic acid, glycolic acid, aldonic acid, such as gluconic acid, ascorbic acid, or uronic acid, such as glucuronic acid, and as polybasic acids, for example, oxalic acid, citric acid, or aldaric acids, such as glucaric or mucic acid. As an example of an anhydride of an organic acid, acetic acid anhydride may be mentioned.

The formation of the formulation, particularly the emulsion, can be effected at temperatures within a range of from 10 to 90° C. for 0.5 to 10 hours with uniform mixing. Preferred are temperatures within a range of from 20 to 70° C.

The reaction times to the formation of the formulations, especially emulsions, according to the invention depend on the temperatures applied. Thus, at very low temperatures, the reaction times are preferably from 5 to 10 hours, while at elevated temperatures, shorter reaction times, especially of between 0.5 and 5 hours, are sufficient.

The invention further relates to the use of the polydiorganosiloxanes of formula (I) for the finishing of organic fibers and textiles in aqueous baths and application liquors, optionally together with conventional amino-functionally modified polydiorganosiloxanes, to achieve a particularly soft and elegant feel of the products.

Particular mention may be made of the forced application by padding when employed on the padding machine, wherein both the dry-in-wet and wet-in-wet processes may be employed. Exhausting, spraying or foam application methods are also well suitable for applying the emulsions.

White textile materials finished with formulations of polydiorganosiloxanes of formula I according to the invention exhibit a significantly reduced yellowing due to the elevated temperatures applied during the thermal stressing as compared with comparable conventional amino-functional polydiorganosiloxane emulsions.

In addition to these advantageous properties, the emulsions according to the invention have a high stability during application, even at strongly alkaline or strongly acidic pH values, so that the precipitation of silicone oil caused by coalescence and thus stains on the textile products are prevented even when extremely unfavourable conditions accumulate, for example, when high pH values and/or high liquor temperatures and/or very high shear stresses occur at the same time, as is usual, for example, on fast-running textile finishing machines.

An advantage over emulsions of cationically functionalized polydiorganosiloxanes having a similar property profile in terms of shear stability, yellowing and pH stability is the strikingly better anion stability of the formulations, especially emulsions, according to the invention. Emulsions of cationically functionalized polydiorganosiloxanes often tend to cause precipitations of silicone oil and transfer onto the textile products in the presence of, for example, carried-over anionic dye residues or anionic textile auxiliaries, which do not occur when the electrically neutral carbamate functional aminopolydiorganosiloxane emulsions according to the invention are employed.

The carbamate-functional polydiorganosiloxanes emulsions according to the invention may at any time be combined with other chemicals usual in textile finishing, such as cellulose cross-linkers, cross-linking catalysts, textile softeners on the basis of fatty acid esters and/or fatty acid amine condensation products, feel-modifying polymer dispersions of various compositions and optical brighteners.

The following examples shall illustrate the invention but shall not be limiting.

EXAMPLES

Materials used in examples: aminopropyl dimethoxymethylsilane (APMDS), aminoethylaminopropyl dimethoxymethylsilane (DYNAS) both from Evonik® Dynasilan range., octamethylcyclotetrasiloxane (D4), α,ω-dihydroxy-polydimethylsiloxane (Dow Coming® 200 fluid range) and α,ω-dimethyl-polydimethylsiloxane (Wacker®AK range), glycerine carbonate from Huntsman Chemicals under the name Jeffsol® GC. Benzyltrimethylammonium hydroxide (40% solution in methanol) from Aldrich Chemicals. All materials are used as received without further purification.

Process for the production of a compound of formula II

For the α,ω-alkyl terminated polydialkylsiloxane containing aminoethylaminopropyl groups, the corresponding synthesis is mainly done by reacting from 100 to 800 parts of α,ω-dimethyl-polydimethylsiloxane with from 100 to 1000 parts of α,ω-dihydroxyl-polydimethylsiloxane or octamethylcyclotetrasiloxane and 10 to 150 parts of aminopropyl dimethoxymethylsilane (APMDS) or aminoethylaminopropyl dimethoxymethylsilane (DYNAS) in the presence of a catalytic amount of benzyl trimethylammonium hydroxide. The molecular weight of the oligomers are adjusted by changing the ratio of α,ω-dimethyl-polydimethylsiloxane to related amines. The reaction is run at 80° C. for 10 hours. After completion of the reaction, the temperature is increased to 170° C. and kept at that temperature for 1 hour to decompose the catalyst. This results in compounds of the following formulas with m+n being a number from 30 to 600.

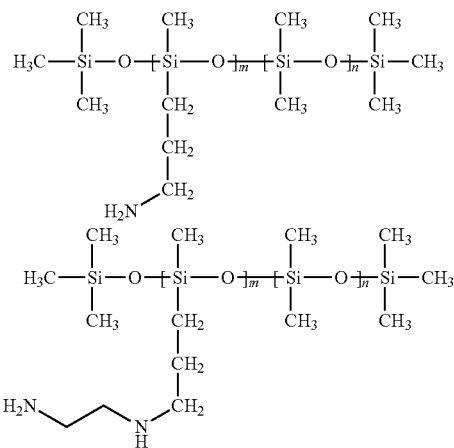

Process for Production of a Compound of Formula I

Example 1

4.69 g (0.04 mol) of glycerine carbonate is added at room temperature to 50 g of a α,ω-methyl terminated polydimethylsiloxane containing aminoethylaminopropyl groups having a content of titrable nitrogen of An=0.53 mmol/g. The mixture is stirred at 120° C. for 8 hours. The resulting white oil shows a final content of titrable nitrogen of An=0.015 mmol/g. Conversion rate: 97%. This process results in a product of the following formula with m+n being a number of from 70 to 100

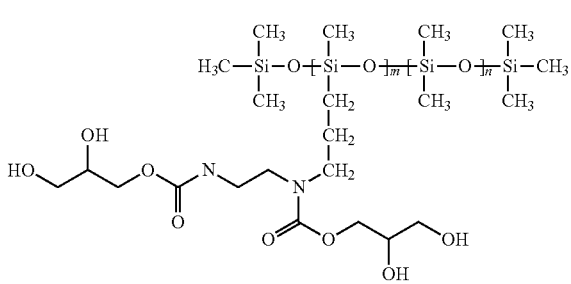

Example 2

6.4 g (0.051 mol) of glycerine carbonate is added to 50 g of a α,ω-methyl terminated polydimethylsiloxane containing aminoethylaminopropyl groups and having a content of titrable nitrogen of An=0.98 mmol/g. The mixture is stirred at 60° C. for 90 minutes. The resulting oil was cooled down to room temperature and its nitrogen content is measured at An=0.06 mmol/g. Viscosity: 3620 Cps. Conversion rate: 94%.

Examples 3 to 6

TABLE 1 is showing further examples of properties of the reaction products of various aminoethylaminopropyl-polydimethylsiloxanes of formula II reacted with glycerine carbonate. The reaction was carried out by following the reaction parameters as in Examples 1 and 2. $An_i$: Initial amine content of the starting material. $An_f$: final amine content of the obtained polymer. The sum of the dimethylsiloxane unit and the methyl-amino siloxane is indicated in the table below as m+n.

| Example | $An_i$ (mmol/g) | m + n | eq GC | Viscosity (Cps) | $An_f$ (mmol/g) | appearance |
|---|---|---|---|---|---|---|
| 3 | 0.98 | 50 | 2 | 3020 | 0.06 | pale yellow |
| 4 | 0.54 | 300 | 2 | 1164000 | 0.02 | white |
| 5 | 0.55 | 170 | 2 | 12020 | 0.04 | white |
| 6 | 0.54 | 42 | 2 | 280 | 0.03 | white |

Example 7

Emulsion process 25 g of the compound obtained according to the Example 2 is added at room temperature to 11 g of isotridecyl ethoxylate with 7 ethylene oxide units, 5 g of hexylene glycol and 64 g of water. This mixture is stirred at room temperature for 90 minutes. The resulting microemulsion is adjusted to pH 5 with acetic acid.

Comparative Example 1

36 g of a polydiorganosiloxane containing aminoethylaminopropyl groups and having a viscosity of 3300 mpa·s and a content of titrable nitrogen with An being 0.1 mmol/g was added to a mixture of 6 g of isotridecyl ethoxylate with 5 ethylene oxide units, 20 g of isotridecyl ethoxylate with 7 ethylene oxide units, and 70 g of water. The turbid emulsion was diluted with another 68 g of water and adjusted to pH 6 with acetic acid to obtain a clear microemulsion.

Evaluation of Properties

The emulsions of compounds obtained in Examples 1 to 6 made following the process of the Example 7 and Comparative Example 1 are tested with respect to the following properties:

a) Shear stability in acidic medium of the polydiorganosiloxane emulsions is examined by preparing 400 ml of a solution with a concentration of 20 g/l, heating to 40° C. and adjusting to pH 5 with acetic acid. Then, the liquor is stirred with a high-speed stirrer (24,000 rpm, Ultra Turrax supplied by Janke & Kunkel) for one minute. The appearance of the liquor after 24 hours is evaluated in terms of turbidity and depositions.

b) Shear stability in weakly alkaline medium of the polydiorganosiloxane emulsions is examined by preparing 400 ml of a solution with a concentration of 20 g/l, heating to 40° C. and adjusting to pH 7.5 with 10% aqueous ammonia solution. Then, the liquor is stirred with a high-speed stirrer (24,000 rpm, Ultra Turrax supplied by Janke & Kunkel) for one minute. The appearance of the liquor after 24 hours is evaluated in terms of turbidity and depositions.

c) Anion Stability: 200 ml of water is mixed with 6 g of polydiorganosiloxane emulsion and 20 g of a dye solution (0.48 g/l Solar Discharge Orange 3 LG and 0.24 g/l Indosol Rubinol SF-RGN, both products of the Clariant Produkte (Schweiz) GmbH) and subsequently adjusted to pH 5 with 60% acetic acid. The liquor is stirred with a paddle agitator at 2000 rpm for 10 minutes and evaluated after 24 hours.

d) Evaluation of feel property: To evaluate the feel property, an experienced team is compiled which evaluates the anonymized feel samples of the fabrics finished with the emulsions of compounds according to Examples 1 to 6 and treated according to Comparative Example 1 using a hand test with a relative scale of from 0 to 10, a value of 10 representing the best soft feel property. As a comparative sample, an untreated fabric of the test series is included.

Softness can also be tested using a handle-0-meter (for example a 21 1-5 Twing Albert). The finished samples are first conditioned (24 hours, 20° C., 65% relative humidity) before being assessed.

e) Evaluation of tendency to yellowing. After the described finishing with the emulsions of compounds according to Examples 1 to 6 and treated according to Comparative Example 1, the above mentioned optically brightened cotton woven fabric (100 g/m2) is additionally dried for one minute at 180° C. The tendency to yellowing after drying at 120° C. and after treatment at 180° C. are evaluated. As a comparative sample, an untreated fabric of the test series is included The degree of yellowing is established with a colour measuring device (Minolta Chromameter CR 331C) and noted as a b+ value. A decreasing tendency to yellowing means smaller b+ values.

Application Examples

The following finishing operations are carried out:
Exhaust Process:

The substrate (tricot fabric, dyed, with or without setting 100% cotton or polyester (50%)/cotton (50%) is added to an aqueous liquor which, based on the substrate, contains 0.5% to 4.0% of the end products according to Examples 1 to 6, at about 40° C. and a liquor ratio of 6:1 to 20:1 in a laboratory jet. After 20 minutes at pH 5.0 to 6.0 (40° C.) and continuous agitation of the substrate, the substrate is removed from the liquor, whizzed and dried tensionless at 140° C. for 70-90 seconds.

Padding Process:

The substrate (tricot or woven fabric, dyed, with or without setting 100% cotton or polyester (50%)/cotton (50%) or polyester (100%) or polyacrylonitrile (100%) or nylon 6 (100%) is padded at room temperature, to a 100% dry weight increase, with an aqueous liquor which contains 15 to 60 g/l of the end products according to Examples 1 to 7. The padded material is subsequently dried at 140° C. for 70-90 seconds.

Conclusion

The application examples result in a very soft, comfortable, silky and elegant feel of the finished textile substrate. In addition, the resulting fabric has a high resilience and improved anti-wrinkle properties. Further the finishes show a better hydrophilicity compared with a fabric finished with comparative example 1. Moreover, the finishes show no yellowing upon ageing. The emulsions made following example 7 show good overall stabilities (pH stabilities and shear forces) and excellent compatibility with resins.

The invention claimed is:

1. A process for finishing organic fibers or textiles in an aqueous bath or application liquor comprising the step of adding at least one carbamate functional polydiorganosiloxane of general formula (I):

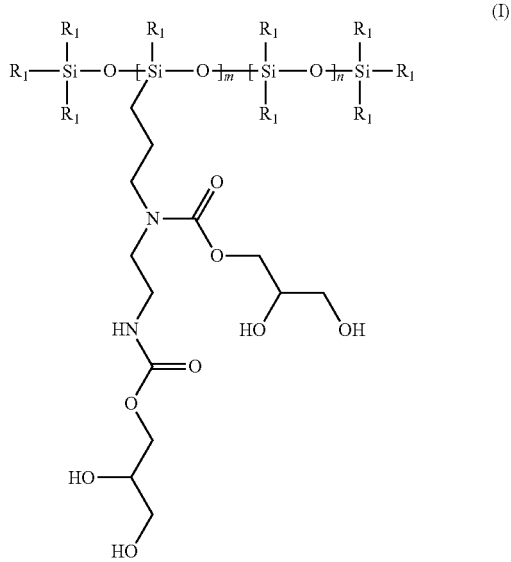

to the aqueous bath or application liquor,
wherein
$R_1$ is the same or different monovalent $C_1$ to $C_{18}$ hydrocarbon residue;
m has an average value of from 1 to 50; and
n has an average value of from 10 to 1500, wherein the finished organic fibers or textiles have a high yellowing resistance and improved soft feel properties.

2. The process according to claim 1 wherein the at least one polydiorganosiloxane is employed in the form of an aqueous formulation.

3. The process according to claim 1, wherein the at least one polydiorganosiloxane is employed in the form of an emulsion.

4. Finished organic fibers or textiles made in accordance with the process of claim 1.

5. The process according to claim 1, wherein
$R_1$ is the same or different methyl and/or phenyl;
m has an average value of from 1 to 10; and
n has an average value of from 40 to 600.

6. the process according to claim 2, wherein the formulation contains from 2 to 80% by weight of at least one polydioorganosiloxane of formula (I).

7. The process according to claim 3, wherein the emulsion is prepared with an emulsifier soluble in the polydiorganosiloxane of formula (I) in two steps, wherein the first step yields a concentration which is diluted with water in the second step.

8. The process according to claim 3, wherein the emulsion contains from 2 to 40% by weight of one or more emulsifiers, based on the total composition.

9. The process according to claim 3, wherein the emulsion has a good shear stability and good pH stability, and have a high stability during application to organic fibers or textiles.

10. A process for finishing textile fibers or fabrics in an aqueous bath or application liquor comprising the step of adding at least one carbamate functional polydiorganosiloxane of general formula (I):

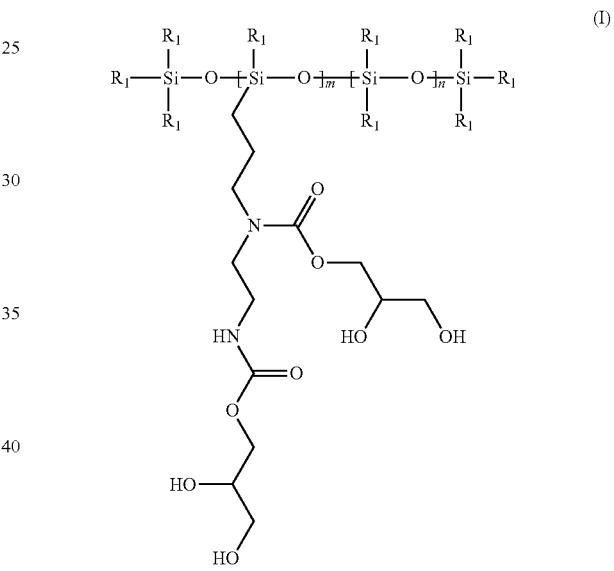

to the aqueous bath or application liquor,
wherein
$R_1$ is the same or different monovalent $C_1$ to $C_{18}$ hydrocarbon residue;
m has an average value of from 1 to 50; and
n has an average value of from 10 to 1500, wherein the finished textile fibers or fabrics have a high yellowing resistance and improved soft feel properties.

11. The process according to claim 10, wherein the at least one polydiorganosiloxane is employed in the form of an aqueous formulation.

12. The process according to claim 10, wherein the at least one polydiorganosiloxane is employed in the form of an emulsion.

13. Finished textile fibers or fabrics made in accordance with the process of claim 10.

14. The process according to claim 10, wherein
$R_1$ is the same or different methyl and/or phenyl;
m has an average value of from 1 to 10; and
n has an average value of from 40 to 600.

* * * * *